United States Patent [19]

Levine

[11] Patent Number: 4,531,023
[45] Date of Patent: Jul. 23, 1985

[54] COMPUTER SECURITY SYSTEM FOR A TIME SHARED COMPUTER ACCESSED OVER TELEPHONE LINES

[75] Inventor: Paul J. Levine, Woodbridge, Va.
[73] Assignee: HLF Corporation, Wilmington, Calif.
[21] Appl. No.: 408,024
[22] Filed: Aug. 13, 1982
[51] Int. Cl.³ ............................................. H04M 11/00
[52] U.S. Cl. ................................. 179/2 R; 179/2 DP; 179/18 FH; 178/22.08; 364/900
[58] Field of Search ................... 179/2 R, 2 A, 2 AM, 179/2 DP, 2 CA, 18 DA, 18 FH; 178/22.01, 22.08; 375/2.1, 2.2; 340/825.31–825.34; 364/200, 900

[56] References Cited

U.S. PATENT DOCUMENTS

| | | | |
|---|---|---|---|
| 3,798,605 | 3/1974 | Feistel | 340/825.3 X |
| 3,984,637 | 10/1976 | Caudill et al. | 179/2 DP |
| 4,218,738 | 8/1980 | Matyas et al. | 178/22.08 X |
| 4,289,931 | 9/1981 | Baker | 179/18 FH X |
| 4,310,720 | 1/1982 | Check, Jr. | 178/22.08 |

Primary Examiner—Gene Z. Rubinson
Assistant Examiner—W. J. Brady
Attorney, Agent, or Firm—Beehler, Pavitt, Siegemund, Jagger & Martella

[57] ABSTRACT

A time-shared central computer can be protected from access from unauthorized users by utilizing automatic tracing equipment included within telephone switching systems, in combination with an independently organized offsite security computer system. The user, seeking to access the central computer through a telephone system, automatically causes his telephone number to be generated within the telephone system and sent to the offsite security computer. Meanwhile, the user provides the time-shared, central computer with a password which is used to address a memory which includes file information on all authorized users. The file information which includes the telephone number of all authorized users, is made available in the offsite security computer for comparison with the telephone number corresponding to the calling user as provided by the telephone switching system. A match indicates that a user, in possession of preauthorized password, is calling from appropriate telephone station. In this case, access is permitted, otherwise access to the central computer will be denied. By using a user nonalterable telephone number, generated in the telephone switching system, falsification of an authorized users identify is prevented. In addition, tampering with the security procedure is prevented by organizing the offsite security computer in such a manner that the user has no access to the system program of the offsite security computer either directly or through the central computer.

26 Claims, 3 Drawing Figures

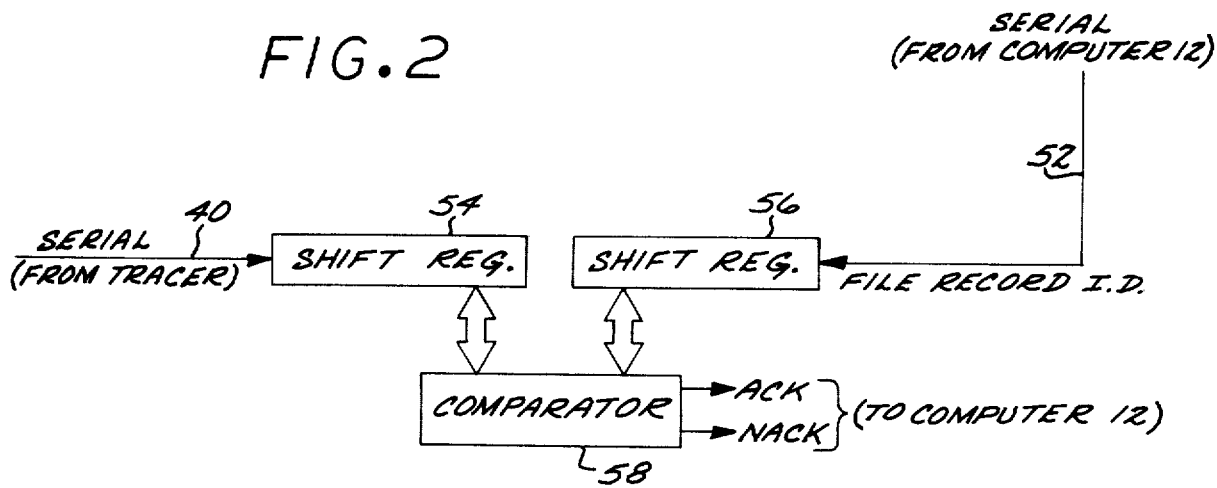
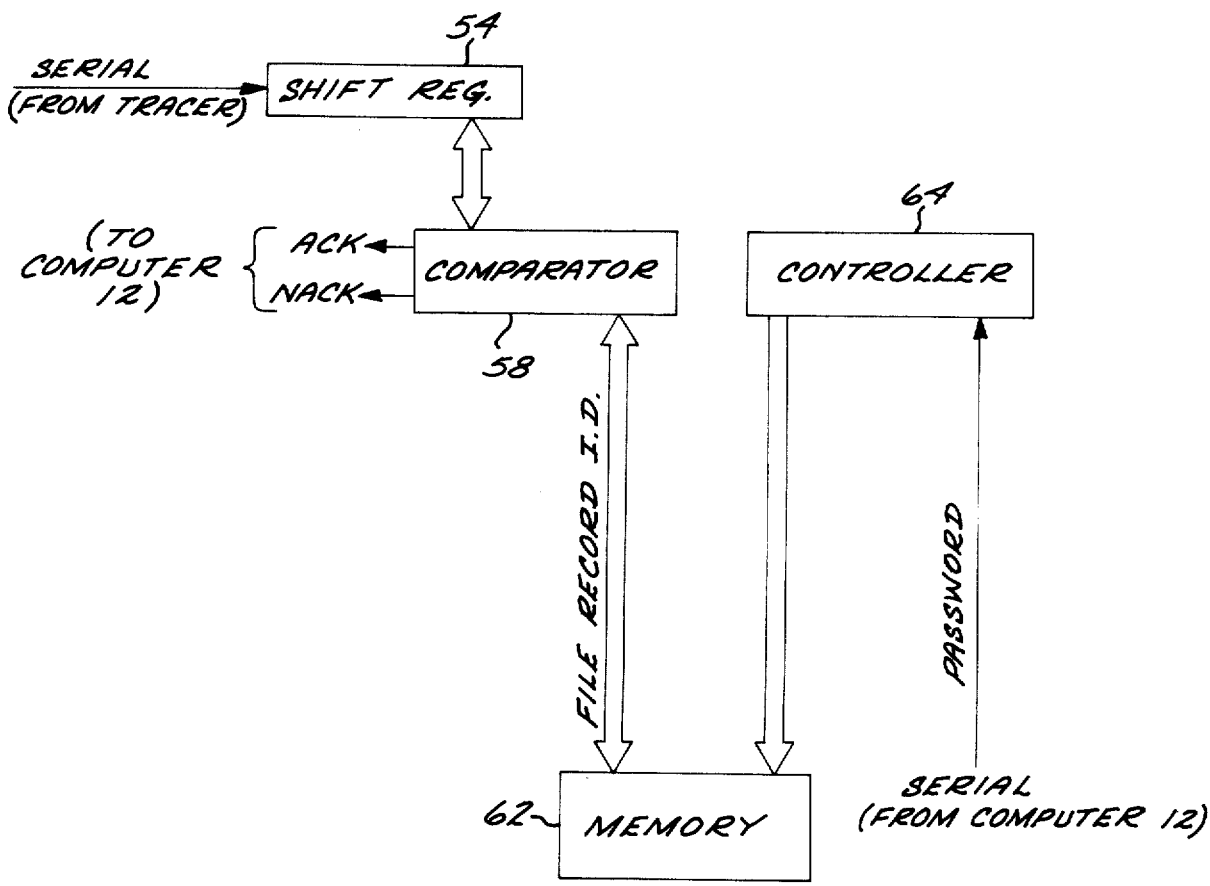

COMPUTER SECURITY SYSTEM FOR A TIME SHARED COMPUTER ACCESSED OVER TELEPHONE LINES

BACKGROUND OF THE INVENTION

1. Field of the Invention

The present invention relates to the field of computer security systems and in particular to those systems for preventing unauthorized access to a time-shared computer which is normally accessed by remote users over conventional telephone lines and equipment.

2. Description of the Prior Art

Time shared computers, accessible over conventional telephone lines by a number of remotely located users, are particularly vulnerable to access by an unauthorized user and to serious disruption or damage to their data bases or programs by malicious and mischievous, unauthorized users. Typically, single or double level software passwords and codes have been employed to distinguish the authorized from the nonauthorized user. However, each of these software encryption systems are susceptible to software decoding, particularly where large numbers of permutations of possible codes and code structures can be searched and tested through the use of microprocessor decoding. A large number of possible combinations can be tried in a short time when a microprocssor is used for accessing.

Since it is no longer possible to secure access through a computer system by the mere number of possible combinations of single or multiple level passwords, the prior art has responded by providing increasingly complex coding and decoding systems, characterized not only by the mere number of possible passwords, but by the complexity of their interrelationships. See for example, Matyas et al, "Method for Authenticating the Identity of a User of an Information System," U.S. Pat. No. 4,218,738; Feistel, "Centralized Verification System," U.S. Pat. No. 3,798,605; and Peters, "Access Control System," U.S. Pat. No. 4,038,637.

The prior art has also attempted to make the access coding unbreakable by utilizing either nonrecurring routines, such as shown by Check, Jr., "Computer Accessing System," U.S. Pat. No. 4,310,720 or by incorporating random number generators in a manner as shown by Atalla, "Method and Apparatus for Securing Data Transmissions," U.S. Pat. No. 4,281,215.

Other prior arts systems for securing access to a computer system have used complex or user nonalterable passwords rather than complex enciphering. For example, Trice et al, "Remote Control Voting System," U.S. Pat. No. 3,525,811 shows a triple level system used for telephonic voting in which the voter provides the computer system with his voting registration number, his secret password, and a selected voice print. Only after all three passwords are authenticated, can the voter actually cast his vote.

Similarly, Caudill et al, "Computer Terminal Security System," U.S. Pat. No. 3,984,637 shows a remote terminal communicating with a time-shared computer through modems over conventional telephone lines wherein the remote user cannnot gain access to the local terminal until he provides the local terminal with an appropriate code word. Thus, the terminal cannot be locally activated without an appropriate password. The terminal then sends a user nonalterable code number to the computer to ensure that access to the computer from unauthorized terminals is prevented.

Constable, "Access- or Transaction-Control Equipment," U.S. Pat. No. 3,892,948 shows a remote computerized teller station in which a bank customer enters a password to gain access to a central processor handling the bank accounts. The remote teller station independently generates a code word based on the information provided by the customer which is then compared with a code word transmitted from the central processing station. The teller station then matches the two code words to determine whether or not to allow the customer access to the time-shared computer.

Each of these prior art systems suffer from the defect that the remote user can gain direct access either to the time-shared computer by his ability to arbitrarily enter access codes, or by his ability to gain direct access by altering or otherwise modifying what is intended to be user nonalterable code numbers. For example, in Caudill, the remote terminal independently sends a password to the time shared computer from a code transmitter physically contained within the remote terminal. The remote terminal can be opened and the thumbwheel switches used to change the otherwise user nonalterable number to falsely change an unauthorized terminal to an authorized one. Each of the other systems, including Constable and Trice, are systems which manipulate or process user supplied information which allows the user to arbitrarily enter as many passwords and password combinations as desired until access is accomplished.

What is needed then is a computer security system which is simple and yet provides a security barrier that cannot be decoded or user altered to gain access to a time-shared computer, even with the aid of computer assisted decoding.

BRIEF SUMMARY OF THE INVENTION

The present invention is a security computer system for preventing unauthorized access to a central computer. The central computer is time-shared and remotely accessed through conventional telephone lines and through a conventional telephone switching system. The telephone switching system is particular characterized by including equipment for the automatic generation of unique identifying information corresponding to a remote caller who is accessing the central computer through the telephone switching system. The computer security system comprises an offsite security computer which is coupled to the telephone switching system and which automatically receives the identifying information relating to the remote caller. The offsite security computer includes a comparator for comparing the unique identifying information obtained from the telephone system with corresponding file information which identifies all authorized users of the central computer system. A file means, which stores the file information corresponding to the authorized users of the central computer system, is coupled to the offsite security computer. The file means provides the file information to the comparator within the offsite security computer for comparison with the unique identifying information generated by the telephone switching system. The offsite security computer generates and transmits to the central computer an acknowledgment signal if the identifying information and file information are identical. A negative acknowledgment signal is generated and transmitted to the central computer by the offsite security computer when the identifying information and file information are not exactly identical. Therefore, the remote caller cannot gain access to the central computer unless he calls from a specified location which is uniquely identified by user nonalterable information.

In particular, the telephone switching system automatically provides the telephone number and address of all callers attempting to access the central computer. The caller provides a password in a conventional manner which is then directly or indirectly used to address corresponding preauthorized file information either stored within a memory in the central computer or in the offsite security computer. The file information is compared to the information received from the telephone switching system to determine whether a caller in possession of a authentic password has called from a preauthorized site. The offsite security computer system is nonaccessible by the remote caller. In addition, the remote caller has no ability whatsoever to alter the telephone number and other data generated by the telephone switching when the remote caller attempts to access the central computer.

These and other embodiments of the invention including this methodolgy, are best understood considering the following drawings.

BRIEF DESCRIPTION OF THE DRAWINGS

FIG. 2 is a diagramatic block diagram showing a first embodiment of a comparator used in the offsite security computer.

FIG. 3 is a block diagram illustrating a second embodiment of the comparator circuitry used in the offsite security computer.

These and other embodiments of the present invention are best understood by viewing the above Figures, wherein like elements are referenced by like numerals, in light of the following Detailed Description of the Preferred Embodiments.

DETAILED DESCRIPTION OF THE PREFERRED EMBODIMENTS

Figure 1:
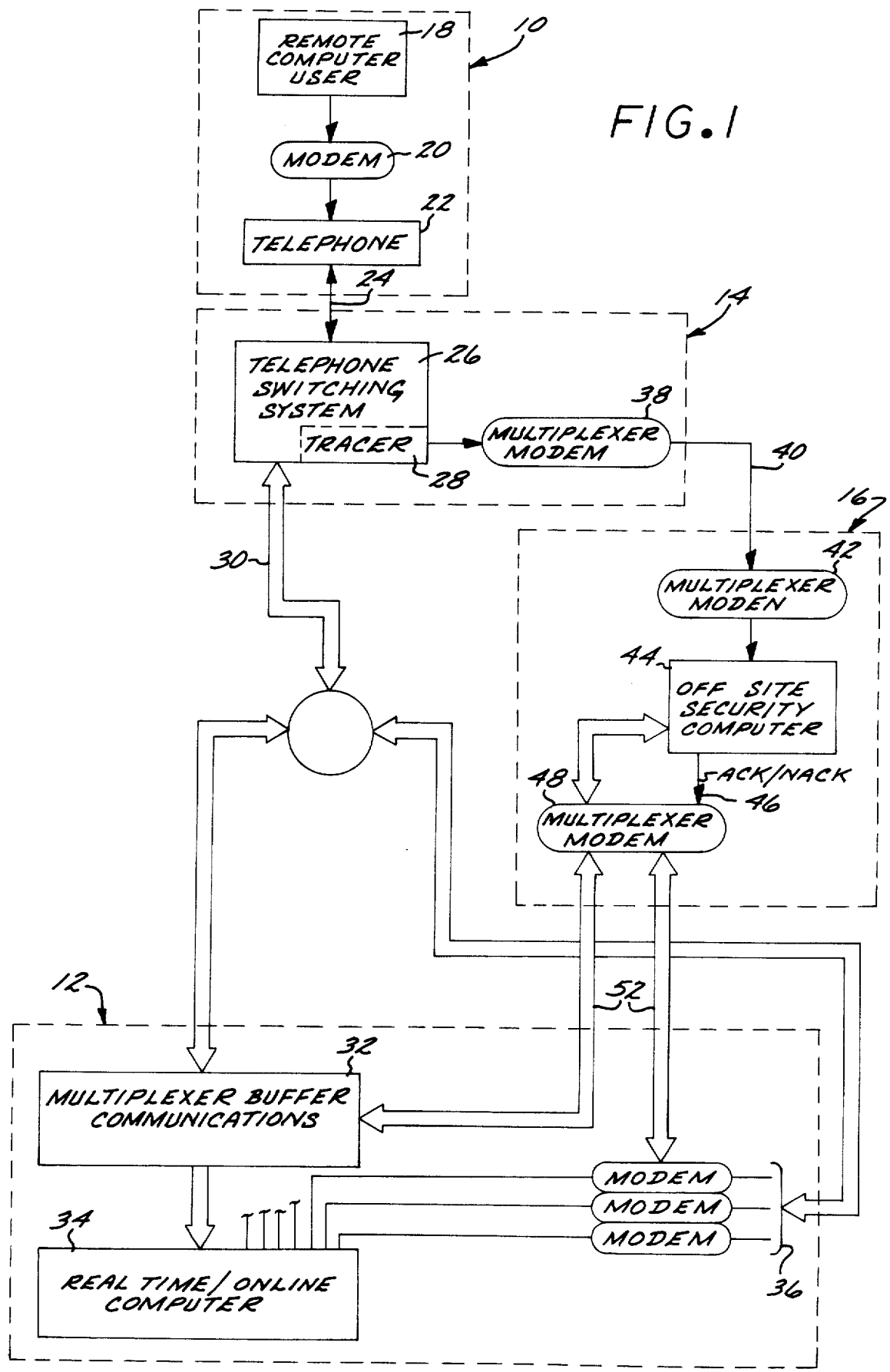
FIG. 1 is a diagramatic block diagram illustrating a security system origanized according to the present invention.

The present invention is an origanization for security systems to protect a time-shared or real-time computer accessible through standard telephone lines from unauthorized access. Security is achieved by independently organizing select portions of the security checking system offsite from the user's terminal and the real-time computer. By exploiting the offsite and independent organization of the security elements of the system, there is no need for the creation of complex cryptographic hardware or methodology and virtually no way to comprise the security of the system without the cooperation of those entrusted to keep its security. The general organization and operation of the system will first be described briefly and then the component parts will be described in detail.

Referring now to FIG. 1, a remote user generally denoted by a reference numeral 10 calls real-time computer system generally denoted by a reference numeral 12, through telephone switching system of the public telephone company, generally denoted by reference numeral 14. Transmissions between remote user 10, telephone switching system 14 and real-time computer system 12 are made on conventional telephone lines using standard modems designed for the transmission of digital information.

Telephone switching system 14 is particularly characterized by the inclusion of the conventional telephone equipment recently developed to automatically trace and identify an incoming call on selected phone numbers. At the present time, this equipment is used in relation to an emergency phone number "911" used by customers of the telephone company to summon emergency medical, fire, or police assistance. Briefly, the customer calls the telephone company on the "911" number, is immediately answered by a specially trained operator who is able to dispatch to the caller the nearest ambulance, fire company, or police patrol. With the present equipment in place, it is not necessary for the caller to correctly identify the location called from, although that may be part of the standard procedure. When the "911" number is called, the telephone number of the subscriber listed under the calling station as well as the address of the calling station is automatically determined and made available to the emergency operator. The operator may then use this information to dispatch the necessary serivces or for other verification purposes.

The same service can be extended to any selected telephone number. Therefore, computer system 12 is automatically provided with the phone number and identity of the calling station even though the phone number of computer system 12 may otherwise appear to be a conventional number. However, instead of processing the caller's phone number, identity, and address within telephone switching system 14, this information is automatically transmitted over a dedicated phone line by conventional means to an offsite security computer system, generally denoted by reference numeral 16.

In the meantime, remote user 10 is connected to real-time computer system 12 as in a normal phone call. Once connection has been made with real-time computer system 12, user 10 then provides real-time computer system 12 with a password in a conventional manner in order to obtain access. The password is an entry address to a look-up table stored within a memory either within real-time computer system 12 or offsite security computer system 16 as described in greater detail below in connection with FIGS. 2 and 3. The password may call up an entire index card containing the subscriber's name, phone number, address, and any other pertinent information. The file information, particularly the phone number and address, called up via the password through real-time computer system 12 is compared in offsite security computer system 16 to the phone number and address automatically supplied from telephone switching system 14. The information is compared bit-by-bit. If an exact match occurs, the offsite security computer system 16 generates an acknowledge signal, ACK, which is communicated to real time computer system 12 by conventional means and allows remote user 10 to make connection to computer system 12. However, if an exact match does not occur, a negative acknowledgement signal (NACK) is communicated by offsite security computer system 16 to real-time computer system 12 and access is denied.

Thus, in order to gain access to real-time computer system 12, remote user 10 must call from an authorized telephone station and provide the appropriate password in order to call up the appropriate file record for comparison. Unlike prior art systems, the remote user has no control whatsoever over the identification of the phone station from which he calls. This information is independently generated and determined by telephone switching system 14 which, within an extremely high degree of confidence, can be assumed to be nonalterable by and nonaccessible to remote user 10. In addition, once access to real-time computer system 12 has been accomplished, remote user 10 cannot in any way access security computer system 16. In other words, remote user 10 can not modify or interfere with the security checking or comparison procedure since the memory and operating system of security computer system 16 is totally independent of real time computer system 12.

Referring again to FIG. 1, consider the detailed of operation of the present invention as diagrammatically depicted. Remote user 10, or more particularly a remote computer user 18, typically a keyboard or local microprocessor, is coupled through a standard modem or acoustic coupler 20 to a conventional telephone or data set 22. Information is conveyed from telephone station 22 along conventional telephone lines 24 to telephone switching system 14. As described above, telephone switching system 14 includes conventional switching equipment 26 in addition to specialized caller tracing equipment 28 similar to that presently used as the "911" emergency number system. The telephone call is switched through switching system 26 and is communicated on conventional telephone lines 30 to real-time computer system 12.

As shown in FIG. 1, real time computer system 12 may include a multiplexer/buffer 32 used as a front end communication network coupling the plurality of phone lines 30 with an on-line computer 34.

Alternatively, in the event real-time computer system 12 does not include a local switching network such as provided by a multiplex/buffer 32, on-line computer 34 may be accessed over a plurality of phone lines 30 through a corresponding plurality individual modems 36.

Therefore, remote computer user 18 calls through telephone switching system 26 in a normal manner and obtains a connection through individual modems 36 or multiplex/buffer 32 with on-line computer 34. Upon hearing an answer back tone from on-line computer 34, remote user 18 couples telephone 22 to modem 20 or otherwise enters into a data transmission mode in a customary manner. Meanwhile, tracer 28 will send the information which telephone switching system 26 has generated through a multiplexer modem 38 across conventional phone line 40. This information is received by a receiving multiplexer modem 42 included within offsite security computer system 16. The information is provided to an operating security computer 44. In addition to the caller's phone number and address, the time of call and date of call is also forwarded by tracer 28 to security computer 44. In the illustrated embodiment, modems 38 and 42 have each been shown as multiplexer modems, thereby sharing a single telephone line 40. However, it would also be regarded as equivalent to provide a plurality of discrete phone lines connecting a corresponding plurality of sending and receiving modems within telephone switching system 14 and offsite security computer system 16. As described in greater detail in FIGS. 2 and 3, information provided from tracer 28 is then stored within security computer 44 for comparison with the file record information which is supplied from real-time computer system 12 in the case of the embodiment in FIG. 2, or is supplied from a local look-up memory within offsite security computer system 16 in the case of the second embodiment of FIG. 3.

Modem 20 has now received the answer back tone from real time computer system 12 and at the same time data, identifying the calling telephone station 22, has been generated, delivered, and stored within offsite security computer system 16. Remote user 10 then enters a conventional password which ultimately serves as an address to look-up the file record identification information stored in a file memory contained within real time computer system 12 or offsite security computer system 16.

The password is any data which is sufficient to identify a user on a single level, conventional security system. The password is then used by real time computer 34 to directly or indirectly search a stored memory file for a complete record of the identified subscriber and to make this record available for comparison within security computer 44. The password may be used as a direct address to the individual record file; used to search for a cross reference to a preauthorized name, phone number and address; or used to verify that it is a legitimate code as compared against a list of stored codes and then upon this first level of authenication, to make the individual file record identification available to security computer 44.

A comparison is made within security computer 44 as described in greater detail in connection with FIGS. 2 and 3 and an acknowledgment signal (ACK) or negative acknowledgment signal (NACK) is generated by security computer 44 and transmitted on line 46 through a multiplexer modem 48 either to multiplexer/buffer 32, in the case where real time computer 12 is provided such a multiplexer/buffer, or to plurality of modems 36 via conventional phone lines 52. In either case, when an acknowledgement signal is received, on-line computer 34 will be initialized and begin a conventional handshaking protocol with remote computer user 18 to ultimately allow access to on-line computer 34. Otherwise, if a negative acknowledgment (NACK) is received, multiplexer/buffer 32 or on-line 34, as appropriate, will directly disconnect from remote computer user 18.

It is also possible that in a low security system, no password would be required, but that security computer 44 would use the telephone number supplied by telephone switching system 14 to search a list of authorized numbers to determine if a match existed.

Consider now FIG. 2 wherein a portion of the comparison circuitry within security computer 44 is described. The caller identification number from tracer 28 is transmitted across telephone line 40 in serial format ultimately to shift register 54. The embodiment of FIG. 2 assumes that on-line computer 34 includes a file memory which is ultimately communicated through modem 48 to shift register 56. Again, communication between real-time computer system 12 and modem 48 is in serial format on a conventional phone line 52. The file record identification is assembled within shift register 56. As soon as the all of file record identification information has been transmitted from the file record memory included within on-line computer 34, shift registers 54 and 56 will contain the user's actual phone number and address from the telephone switching system 14 and the user's file record phone number, as determined by the prearranged password look-up procedure. At this time, the contents of shift registers 54 and 56 are compared in parallel in comparator 58 on a bit-by-bit basis. If each bit of the user's actual phone number and address stored within shift register 54 compares identically with each bit of the file record phone number and address contained within shift register 56, comparator 58 will generate an acknowledgment signal, ACK, otherwise a negative acknowledgment, NACK, will be generated. In either case, ACK or NACK will be communicated to real-time computer system 12 for appropriate response.

Referring now to FIG. 3, a second embodiment of the circuitry included within security computer 44 is illustrated in which the file record information is stored locally. As before, the second embodiment includes shift register 54 which has its serially formatted input ultimately coupled to tracer 28. The file record identification information is directly transmitted in parallel format from a local record memory 62 included as part of offsite security computer system 16. Access to memory 62 is controlled by controller 64, which may be a conventional microprocessor or other specialized circuitry for processing the password which is received in serial format through modem 48 from real-time system computer 12. Remote computer caller 18 transmits this password through telephone switching system 26 to real-time computer system 12 which in turn forwards the password in serial format through modem 48 to controller 64. Controller 64 in turn uses the password in one of the previously mentioned ways to ultimately address the file record identification information in memory 62 and load that information into comparator 58. As before, the information loaded within shift register 54 and is compared on a bit-by-bit basis in comparator 58 and an ACK or NACK signal generated as appropriate.

Referring again to FIG. 1, it is also included within the scope of the present invention that the file record information contained within memory 62, or within part of the system memory of real-time computer system 12, may include a listing of a plurality of phone numbers and addresses to allow the user access to computer system 12 from any one of the plurality of corresponding locations. In this embodiment, each of the locations corresponding to a single password or equivalently to a corresponding plurality of passwords would be retrieved from the file record memory in sequence until either an exact match was found or the entire list exhausted without a match.

It is further within the scope of the present invention that the user may temporarily change the authorized calling location. In this case, the user calls the offsite security computer center through the normal lines of communication, identifies himself and supplies his identification number and password to a human operator. No direct phone coupling to security computer system 16 is possible. The security center employee then calls up the user's information from the record file to verify the information orally provided over the telephone. If the user can verify the detailed information contained within his record file, then the security center employee will ask for the substitute phone and location. The temporary number and substitute location will be keyed and stored within a temporary memory location within security computer system 16. Remote computer user 18 will then have a predetermined amount of time during which to contact real-time computer system 12 from the alternative site. For example, it is contemplated that a period of three minutes should a provide sufficient interval for an offsite user to call real-time computer system 12 from the new remote location and to transmit his password to computer system 12. If a successsfull comparison is not made within the predetermined time period, the temporary file is erased. Transmission of the pre-established password will of course address the permanent remote station of the user. A flag is set by the security center computer in the permanent, record file of the user to indicate that a temporary location has been set up in the temporary memory. The existence of the flag will automatically instruct security computer 44 to address a predetermined location within the temporary file where an alternative number will be stored. The number and address stored within the temporary file, which actually may be a portion of memory 62, will then be read for comparison.

Security computer system 16 will be provided the phone number, address, name, date, and time of day of each incoming call, whether or not the call successfully accesses the real-time computer 12. A copy of these incoming calls can be achieved and automatically reviewed for the existence of unauthorized patterns with appropriate action to be taken in each case. For example, a subscriber may desire his remote terminal to be utilized only during working hours of the business day. An appropriate flag included as part of the file record identification information can be automatically be set by the security computer office to indicate those days and times of days in which a comparison, even if valid, is not permitted. In addition to accounting information which may be collected and processed by security computer 34, a subscriber may further wish that only a limited number of accesses to real time computer system 12 be allowed within a specified period. Again, the number of accesses for any one user can be recorded, accumulated, and acted upon if a pre-established limit has been exceeded. Repeated, unsuccessful attempts by an unauthorized user to gain access to real-time computer 12 will be evident. An internal security system can be included within the programming of security computer 44 such that if a single location unsuccessfully attempts to access real-time computer system 12 more than a predetermined number of time in a given interval all future calls from that remote location will automatically be disregarded even if the previous remote user ultimately derives the appropriate password. For example, more than 25 unsuccessful accesses within a one hour period could cause that accessing location to be blacklisted by storing the calling number within a special memory section within security computer 44. After blacklisting any further access from that location will automatically generate a NACK signal regardless of the password actually supplied to real time computer 12. Security personnel will then be automatically alerted and provided with the name, phone number and address of the unsuccessful user. Security personnel can then directly call the unsuccessful user to provide him with assistance if he was authorized to enable him to make successful access; or if unauthorized to warn the unauthorized user that his presence has been detected, that all further attempts to access the system will be automatically denied and recorded, and that if persistent attempts are continued to wrongfully access real-time computer 12, appropriate legal action will be taken.

Many other schemes and functional programs can be derived by those having ordinary skill in the art to increase the measure of security obtainable as a result of the ability to receive and process user nonalterable information which is automatically generated each time the remote user attempts to access the computer. In addition, each of these security measures cannot be frustrated since there is no direct phone line from the remote user to security computer 44. Direct communication with security computer 44 is provided only through dedicated tracer equipment 28 within telephone switching system 14 and specialized data lines between real-time computer system 12 and security computer system 16. It is still possible for an authorized user to legitimately gain access to real-time computer system 12 and by ingenious effort possibly obtain the file record identification information of others or access other programming within computer system 12. The present invention is not meant to prevent malicious damage from authorized users, but to prevent access and malicious damage from unauthorized users. The unauthorized user cannot crack the code system because he has no ability to change the caller identification information generated by tracer 28 within telephone switching system 14. Moreover, the unauthorized user has no direct phone link to security computer system 16.

The particulars of real time computer system 12 can vary in a large number of ways both as to the format and contents of information constituting record file indentification and hardware organization. Further, the internal organizaion of security computer system 16 can also be organized in a large number of other ways without departing from the spirit and scope of the present invention.

Although FIG. 1 shows only a single remote user, the invention intended to provide authenication for a large number of users. Each of a plurality of simultaneously calling users are tracked and separtely processed using conventional time-sharing program techniques well known to the art.

The above embodiments have been described only for the purpose of illustration and example and anre not to be taken as limiting the scope of the following claims.

I claim:

1. A computer security system for preventing unauthorized access to a central computer, said central computer being remotely accessed through conventional telephone lines and through a conventional telephone switching system, said telephone switching system, characterized by automatic generation within said telephone switching system of unique identifying information corresponding to a remote caller accessing said central computer through said telephone switching system, said computer security system comprising:

an offsite security computer coupled to said telephone switching system for automatically receiving said identifying information relating to said remote caller, said offsite security computer includes a comparator for comparing said unique identifying information obtained from said telephone switching system corresponding to said remote caller with corresponding file information identifying all authorized users of said central computer system; and file means for storing said file information corresponding to authorized users of said central computer, said file means coupled to said offsite security computer and for providing said file information to said comparator within said offsite security computer for comparison with said unique identifying information generated by said telephone switching system, wherein said offsite security computer generates and transmits to said central computer an acknowledgment signal if said identifying information and file information are exactly identical, and generates and transmits to said central computer a negative acknowledgment signal when said identifying information and file information are not exactly identical, whereby said remote caller to said central computer cannot gain access to said central computer unless calling from a specified location which specified location is uniquely identified by user nonalterable information.

2. The computer security system of claim 1 wherein said offsite security computer is coupled to said telephone switching system and said central computer only through user nonaccessable communication lines.

3. The computer security system of claim 1 or 2 wherein said offsite security computer communicates with said central computer only through said acknowledgment and negative acknowledgment signals, whereby said offsite security computer is inaccessable from said central computer and from said remote caller accessing said central computer.

4. The computer security system of claim 1 wherein said remote caller called through said telephone switching system with a conventional telephone sending and receiving unit and wherein said unique identifying information generated in said telephone switching system and communicated to said offsite security computer includes the telephone number of said telephone sending and receiving unit used by said remote caller to call said central computer through said telephone sytem, and wherein said file information stored within said file means includes a preauthorized telephone number corresponding to a permitted station from said authorized user.

5. The computer security system of claim 4 wherein said unique identifying information includes in addition said telephone number, the address of the location of said telephone sending/receiving unit, and wherein said file information stored within said file means includes a preauthorized address location.

6. The computer security system of claim 1 wherein said file means includes memory within said central computer, said file information stored within said memory, said memory being communicated with said offsite security computer through conventional telephone lines.

7. The computer security system of claim 1 wherein said file means is a memory included within said offsite security computer and wherein said central computer has no access to said memory including said file information.

8. The computer security system of claim 1 wherein said offsite security computer further includes means for temporarily altering said file information stored within said file means and for retaining said altered file information for comparison within said comparator with said unique identifying information for a predetermined time interval, whereby said remote caller may access said central computer through said telephone switching system from an alternative site provided that said telephone switching system generates appropriately modified identifying information and transmits said appropriately modified identifying information to said offsite security computer within said predetermined time interval.

9. The computer security system of claim 1 wherein said file means includes a plurality of units of file information identifying a corresponding plurality of authorized remote callersites, each of said plurality of units of file information being coupled to said comparator to determine whether any one of said plurality of units of file information exactly compare to said unique identifying information generated by said telephone switching system.

10. A computer security system comprising:
a plurality of remote user sites:
a telephone switching system particularly characterized by including means for generating uniquely identifying information corresponding to each one of said plurality of remote user sites when a call is placed through said corresponding remote user site through said telephone switching system; and
a central computer system coupled to said telephone switching system for communication with said remote user sites; and
an offsite security computer coupled to said means for generating said uniquely identifying information within said telephone switching system, said offsite security computer coupled to said central computer system, said offsite security computer including a comparator for comparing said unique identifying information generated by said telephone switching system with selected file information to generate and communicate to said central computer system a signal indictive of whether an exact match between said unique identifying information and said file information has been achieved, said central computer system permitting access only when offsite security computer indicates an exact match, whereby access to said central computer from said plurality of remote user sites through said telephone switching system is permitted only when said unique identfying information generated in said telephone switching system matches a preauthorized file information record.

11. The computer security system of claim 10 wherein said file information is stored within a memory included within said offsite security system.

12. The computer security system of claim 10 wherein said file information is stored within said central computer system, said file information being communicated on conventional telephone lines to said offsite security computer for comparison within said comparator.

13. The security computer system of claim 10 wherein said means for generating said unique identifying information only communicates said information to said offsite security computer system when said central computer is accessed from said remote user sites through said telephone switching system.

14. A method for providing security for a central computer system remotely accessed through conventional telephone lines and a conventional telephone switching system, said telephone switching system characterized by automatic generation of unique identifying information corresponding to a remote caller accessing said central computer through said telephone switching system, said method comprising the steps:
generating said unique identifying information in said telephone switching system;
communicating said unique identifying information to an offsite security computer coupled to said telephone switching system, said identifying information relating to said remote caller;
selectively reading file information corresponding to authorized users of said central computer from a file means used for storing said file information, said means being coupled to said offsite security computer;
providing said file information from said file means to the comparator included within said offsite security computer;
comparing said file information and said unique identifying information within said comparator to determine whether or not said file information and said unique identifying information exactly match;
generating an acknowledgment signal within an offsite security computer; and,
communicating an acknowledgment signal from said offsite security computer to said central computer to indicate whether or not access to said central computer from said remote caller is allowed, whereby said remote caller cannot alter said unique identifying information to gain access to said central computer.

15. The method of claim 14 where said step of communicating said unique identifying information from said telephone switching system to said offsite security computer is through user nonaccessible communication lines.

16. The method of claim 14 or 15 where said step of communicating said acknowledgment signal from said offsite security computer to said central computer is the exclusive type of communication possible between said offsite security computer and said central computer, whereby information in said offsite security computer is unmodifiable from said central computer and from said remote caller accessing said central computer.

17. The method of claim 14 where said unique identifying information generated in said telephone switching system and communicated to said offsite security computer includes the telephone number of said remote caller accessing said central computer through said telephone switching system.

18. The method of claim 17 where said unique identifying information also includes the address of the location of said remote caller and wherein said file information stored within said file means includes a preauthorized address location.

19. The method of claim 14 wherein said file means includes a memory within said central computer and said step of selectively reading said file information to said comparator includes the step of reading said file information stored within said memory and communicating said file information with said offsite security computer through a conventional telephone line.

20. The method of claim 14 where said file means is a memory included within said offsite security computer and where said step of selectively reading said file information includes local access of said memory by said offsite computer so that said central computer has no access to said memory including said file information.

21. The method of claim 14 further including the steps of:
temporarily altering said file information stored within said file means;
retaining said altered file information within a temporary memory;
comparing said altered file information within said comparator with said unique identifying information, said step of comparing executeable within a limited, predetermined time interval, whereby said remote caller may access said central computer through said telephone switching system from an alternative site provided that said telephone switching system generates appropriately modified identifying information and transmits said appropriately modified identifying information to said offsite security computer within said predetermined time interval.

22. The method of claim 14 wherein said file means includes a plurality of units of file information identifying a corresponding plurality of authorized remote caller sites said method further including the steps of comparing each of the said plurality of said units of file information in said comparator to determine whether any of said plurality of units of file information exactly match said unique identfying information generated by said telephone switching system.

23. A computer security system for preventing unauthorized access to a central computer, said central computer being remotely accessed through conventional telephone lines and through a conventional telephone switching system, said telephone switching system, characterized by automatic generation within said telephone switching system of unique identifying information corresponding to a remote caller accessing said central computer through said telephone switching system, said computer security system comprising:

a security computer coupled to said telephone switching system for automatically receiving said identifying information relating to said remote caller, wherein said security computer includes a comparator for comparing said unique identifying information obtained from said telephone switching system corresponding to said remote caller with corresponding file information identifying all authorized users of said central computer system; and file means for storing said file information corresponding to authorized users of said central computer, said file means coupled to said security computer and for providing said file information to said comparator within said security computer for comparison with said unique identifying information generated by said telephone switching system, wherein said security computer generates an acknowledgment signal if said identifying information and file information are exactly identical, and generates a negative acknowledgment signal when said identifying information and file information are not exactly identical, whereby said remote caller to said central computer cannot gain access to said central computer unless calling from a specified location, which specified location is uniquely identified by user nonalterable information.

24. The computer security system of claim 23 wherein said security computer is part of said central computer.

25. A computer security system comprising:
a plurality of remote user sites;

a telephone switching system particularly characterized by including means for generating unique identifying information corresponding to each one of said plurality of remote user sites when a call is placed from said corresponding remote user site through said telephone switching system; and a central computer system coupled to said telephone switching system for communicating with said remote user sites, central computer system coupled to said means for generating said unique identifying information within said telephone switching system, said central computer system including a comparator for for comparing said unique identifying information generated by said telephone switching system with selected file information to generate a signal indicative when an exact match between said unique identifying information and said file information has been achieved, said central computer system permitting access only when said unique identifying information generated in said telephone switching system matches a preauthorized file information record.

26. A method for providing security for a central computer system remotely accessed through conventional telephone lines and through a conventional telephone switching system, said telephone switching system characterized by automatic generation of unique identifying information corresponding to a remote caller accessing said central computer through said telephone switching system, said method comprising the steps:

generating said unique identifying information in said telephone switching system;

communicating said unique identifying information to said central computer system coupled to said telephone switching system, said identifying information relating to said remote caller;

selectively reading file information corresponding to authorized users of said central computer from a file means used for storing said file information, said file means being included in said central computer system;

providing said file information from said file means to the comparator included within said central computer system;

comparing said file information and said unique identifying information within said comparator to determine whether or not said file information and said unique identifying information exactly match; and generating an acknowledgement signal within said central computer system, to indicate whether or not access to said central computer from said remote caller is allowed, whereby said remote caller cannot alter said unique identifying information to gain access to said central computer

* * * * *